United States Patent [19]

Meyer

[11] Patent Number: 5,304,054
[45] Date of Patent: Apr. 19, 1994

[54] PLASTICIZING SECTIONS OF COLD FEED RUBBER EXTRUDERS

[75] Inventor: Paul Meyer, Ascona, Switzerland

[73] Assignee: Frenkel C-D Aktiengesellschaft, Basle, Switzerland

[21] Appl. No.: 967,959

[22] Filed: Oct. 27, 1992

Related U.S. Application Data

[63] Continuation-in-part of Ser. No. 694,713, May 2, 1991, abandoned, which is a continuation-in-part of Ser. No. 691,268, Apr. 25, 1991, Pat. No. 5,215,374.

[30] Foreign Application Priority Data

Apr. 19, 1991 [GB] United Kingdom ............... 91084897

[51] Int. Cl.$^5$ ............................................. B29C 47/00
[52] U.S. Cl. ......................................... 425/208; 366/80; 366/90; 425/209; 425/378.1; 425/382.4
[58] Field of Search ............. 366/79, 80, 89, 90; 425/200, 205, 207, 208, 209, 376.1, 378.1, 382.4

[56] References Cited

U.S. PATENT DOCUMENTS

| Re. 26,147 | 1/1967 | Parshall et al. | 366/80 |
|---|---|---|---|
| 893,385 | 7/1908 | Schlickeysen | 366/80 |
| 2,213,381 | 9/1940 | Brown | 366/80 |
| 2,744,287 | 5/1956 | Parshall et al. | 366/300 |
| 3,169,752 | 2/1965 | De Laubarede | 366/80 |
| 3,347,528 | 10/1967 | List et al. | 366/80 |
| 3,367,635 | 2/1968 | Gresch | 366/90 |
| 3,458,894 | 8/1969 | Wheeler | 366/90 |
| 3,873,072 | 3/1975 | Blackmon | 366/80 |
| 3,981,658 | 9/1976 | Briggs | 366/80 |
| 4,136,969 | 1/1979 | Meyer | 366/90 |
| 4,178,104 | 12/1979 | Menges et al. | 366/80 |
| 4,184,772 | 1/1980 | Meyer | 366/89 |
| 4,199,263 | 4/1980 | Menges et al. | 366/307 |
| 4,416,543 | 11/1983 | Brinkmann | 366/80 |
| 4,538,917 | 9/1985 | Harms | 366/90 |
| 4,640,672 | 2/1987 | Ellwood | 425/205 |
| 4,720,254 | 1/1988 | Wood | 366/90 |
| 4,723,901 | 2/1988 | Sarumaru | 366/80 |
| 4,957,372 | 9/1990 | Meyer | 366/90 |
| 4,960,328 | 10/1990 | Schumacher et al. | 366/90 |
| 5,127,741 | 7/1992 | Capelle et al. | 366/80 |
| 5,141,426 | 8/1992 | Capelle | 425/205 |
| 5,145,352 | 9/1992 | Capelle | 425/205 |
| 5,147,198 | 9/1992 | Capelle et al. | 425/205 |

*Primary Examiner*—Charles S. Bushey
*Attorney, Agent, or Firm*—Gottlieb, Rackman and Reisman

[57] ABSTRACT

A Transfermix cold feed extruder having a plasticizing section that includes a plurality of screw flights therein in a transfer zone that is formed over a common length of the screw and barrel of the extruder. In the transfer zone, a helical groove in the screw varies in cross section from a full area to a zero area, and a helical groove of opposite hand in the barrel correspondingly varies in cross section from a zero area to a full area. The extruder is provided with a set of flow deflectors in a cut in the screw positioned immediately upstream of the plasticizing section. By the coaction of the flow deflectors with the plurality of screw flights, an increase of throughput for difficult-to-extrude compounds, with an improvement in the quality of the extrudate, is obtained in a surprising manner.

4 Claims, 3 Drawing Sheets

PLASTICIZING SECTIONS OF COLD FEED RUBBER EXTRUDERS

This is a continuation-in-part of copending application Ser. No. 07/694,713, filed on May 2, 1991, now abandoned, which in turn was a continuation-in-part of copending application Ser. No. 07/691,268, filed Apr. 25, 1991, now U.S. Pat. No. 5,215,374, both of which prior applications were filed in the name of the same inventor, and were assigned to the same assignee, as the present invention.

BACKGROUND OF THE INVENTION

1. Technical Field

The present invention relates to cold feed rubber extruders.

2. Description of Related Art

Cold feed rubber extruders, generally comprising a feed-opening, a compression-section, a plasticizing section and an exit section leading to an extrusion head, have been replacing warm feed rubber extruders throughout the Industry, though for certain compounds and applications the latter still persist.

With advances in design, mainly in the plasticizing section, the range has been extended to include more rubber compounds which had been found difficult to extrude on account of high viscosity (Mooney values), nerve (natural rubber compounds), hardness, high filler-content or special sensitivity to heat build-up.

Such a plasticizing section has been the Transfermix (U.S. Pat. No. 2,744,287 Parshall & Geyer 1956, U.S. Pat. No. Re. 26,147 of 1967 or UK Pat. No. 842,692 Frenkel of 1956 or U.S. Pat. No. 4,136,969 Meyer of 1979 or U.S. Pat. No. 4,184,772, Meyer of 1979) having the generic feature that in a transfer-zone formed over a common length of screw and barrel, in the screw a helical groove varies in cross-section from full area to zero area and in the barrel the cross-section of an opposite handed helical groove varies from zero area to full area, whereby in the said transfer-zone the compound is transferred from the said screw into the said barrel, while being mixed and plasticized. The said plasticizing section may comprise only one such transferzone or more, where a second one is conversely adapted by way of changes in cross-sections of helices to effect a return-transfer from barrel to screw.

For a given cross-sectional area between the bottom of the screw-helix and that of the barrel helix, such a Transfermix geometry provides a uniform action of flow division and rearrangement, treating on one transfer each subdivision just once and none repeatedly, unlike other plasticizing systems, which operate non-uniformly to different degrees and are therefore less effective.

Mathematics can be developed to show that for the earlier (1956) generation of Transfermix having invariant numbers of helical grooves in each transfer-zone, this number is limited by the condition of maintaining continuity of transport by shear stress transfer in the rubber. Expressed simply, this means avoiding grooves which get too deep and narrow so that there can be no more forward transport in the bottoms of the grooves due to the relative rotation of the screw and barrel and the grooves are no longer self-cleaning.

This limitation is, to a large measure, overcome in the second (1979) generation of Transfermix, where the number of helical grooves varies inversely as between screw and barrel within the same transfer-zone, whereby the width/depth ratio of individual helical channels can be kept such that transport flow—and thereby the important practical feature of self-cleaning—is maintained while effecting a much more intense flow-division and rearrangement, which in equal intensity can be realized for any diameter of Transfermix. Hence the designation "Multi Cut Transfermix" and the considerable widening of its plasticizing action into the range of difficult-to-extrude compounds, as well as its solution of the scale-up problem, enabling an equal plasticizing action to be designed into any diameter of a range of extruders similar in outline dimensions, such as L/D ratio.

To quote numbers on the example of a 90 mm Transfermix: In the first generation the maximum number of helical grooves in both screw and barrel for an output typical for this size would be 4-6 in the screw and 4-6 in the barrel, making 16 to 36 subdivisions, whereas the Multi Cut Transfermix would bring about 40 to 80 subdivisions.

This concentrated action, compared to other types of plasticizing section, has for both generations led to transfer-zones of a length of 1 to 1.5 screw diameters, which has allowed "easy to extrude" compounds to be plasticized homogeneously at relatively low temperatures with throughput restricted by the die-resistance only, while for more "difficult" compounds various degrees of throttling in addition to the die-resistance bring uniformity into the plasticization, thus greatly extending the range of compounds.

A disadvantage noted in the compression-section as an area serving a Transfermix plasticising section has been the following:

According to experience with Transfermix systems gained particularly on tough natural rubber (NR) and highly loaded compounds, a plain screw-compression-section leads to very high torques on the screw by leaving practically the total work of plasticization to the Transfermix-section—so much so that in certain cases a drive installed for normal compounds was stopped. Some relief was obtained by notching the screw flights over a part of their depth and at a flight-angle higher than that of the groove, not only in the entry-zone, where this is a useful measure for gripping the feed, but additionally up to about three-quarter way into the compression zone, which had a preplasticising effect and made the drive adequate again.

This, however, reduced the pressure-build up and could not produce a pre-plastication extending over the full depth of the screw channels.

Of other known plasticizing systems, especially the type called Pin Barrel Extruder (U.S. Pat. No. 4,178,104 Menges et al of 1979 corrected to 4,199,263 of 1980) has found wide application in the last 15 years. In this, at various positions along the length of a screw, rings of radially arranged flow-interruptors, mostly pins of circular cross-section, extend from the barrel into corresponding circular cuts in the screw, reaching to the bottom of the helical grooves. In each such ring, the diameter of the pins must be sufficient to withstand the considerable forces exerted by the flow of the rubber and the number of pins is limited by the fact that they must avoid throttling the forward flow.

With rotation and corresponding forward transport of compound, these pins, which loosely fit into the cuts in the screw, exert a kneading action which, on account of the above limitations on diameter and number of pins, is non-uniform around the circumference.

This kneading action is repeated in a number of so-called pin-planes, each at least one pitch-length of the screw away from the next, and has been used for plastification in extruders up to large diameters. The number of such pin-planes ranges from about 6 for easy-to-plasticize compounds to 10 or more for more difficult compounds, where excessive temperature development has generally limited the application of such extruders at the difficult end of the range of compounds.

It can be observed that in a pin plane, some elements of the flow of material are being deformed, rather than sliced, circumferentially while others slip undeformed between the pins, whereas in a Transfermix this flow is being sliced circumferentially into elements, each one a part of a thin shell, of substantially equal area and distributed over the radial depth of the screw in an orderly fashion. The deforming action in a pin plane, having regard to the necessarily small number of pins around the circumference in order to avoid throttling the flow, can not be anything like as concentrated as in any Transfermix that way, nor can this be lengthwise of the screw on account of the intervening lengths of screw between the pin-planes.

In each pin plane, however, the rotation of the compound is reduced relative to that of the screw so that on being gripped again by the rotating screw thereafter, the pressure-build-up is increased locally and forward transport tends to be improved.

This improvement in transport-action over that by the screw on its own is very limited for these reasons:

In order to be effective as a kneading element; the fit of the pins in the cuts of the screw has to be very loose. Furthermore, the number of starts of the screw that reinduce rotation of a segment of the compound is generally not above two. As a general comparison, in an axial flow pump a large number of vanes would be mounted in the rotor for inducing pressure-build up at as many circumferential positions as possible.

In the second generation of Transfermix, the problems of plasticization have been solved by providing a multiplicity of flights in the screw and the barrel in special arrangements, where at the beginning of the plasticizing zone the screw already has many more flights than in the preceding compression-zone.

It is an object of this invention to provide, in combination with a Transfermix plasticizing section, a means for effecting at the end of the compression zone a preplasticizing effect which extends over the full depth of the helical grooves.

It is a further object of this invention that such a preplasticizing effect be achieved with a substantial increase of the pressure build-up immediately upstream.

SUMMARY OF THE INVENTION

In order to achieve these objects, this invention provides:

An extruder with a screw rotatably mounted and driven to coact with a barrel, said extruder comprising an inlet, a compression section, a plasticizing section and an exit-section, the said plasticizing section embodying a Transfermix geometry according to U.S. Pat. No. 2,744,287 of 1956, U.S. Pat. No. Re. 26,147 of 1967 or to U.S. Pat. No. 4,136,969 of 1979 or to U.S. Pat. No. 4,184,772 of 1979, the said plasticizing section having the generic feature that following said compression-section, a plurality of helical grooves in the screw varies in cross-section from full area to zero area and in a substantially corresponding length of the barrel the cross-section of a plurality of opposite-handed helical grooves varies from zero area to full area, whereby in operation the flowing material is transferred from the screw to the barrel while being mixed and plasticized, the said screw immediately upstream of the said plasticising section comprising a circumferential cut extending substantially to the bottom of the said helical groove, and the said barrel at the position of the said cut having joined with it so as to be immobile relative to it a set of flow interruptors, substantially equally spaced around its circumference, and extending substantially to the bottom of the said helical groove, the said flow interruptors loosely fitting into the said cut in the screw.

In an embodiment of this invention, the flow interrupters joined to the barrel may be arranged in the cut in the screw to be closer to the plurality of threads of the Transfermix section then to the upstream threads of the transporting section.

In an embodiment of this invention, the said flow-interruptors may be pins of substantially circular cross-section each arranged radially of the said screw.

In an embodiment of this invention, the said flow-interruptors may be vanes adapted to substantially redirect the flow of material.

In an embodiment of this invention, the said flow-interruptors may be vanes with cutting edges directed into the flow for promoting comminution of parts of the flow with minimum mechanical energy and thus heat-input, preparatory to plasticization and which may be separately heated for this purpose.

BRIEF DESCRIPTION OF THE DRAWINGS

The invention will now be described in some detail with reference to the accompanying drawing in which.

DESCRIPTION OF A PREFERRED EMBODIMENT

Figure 1:
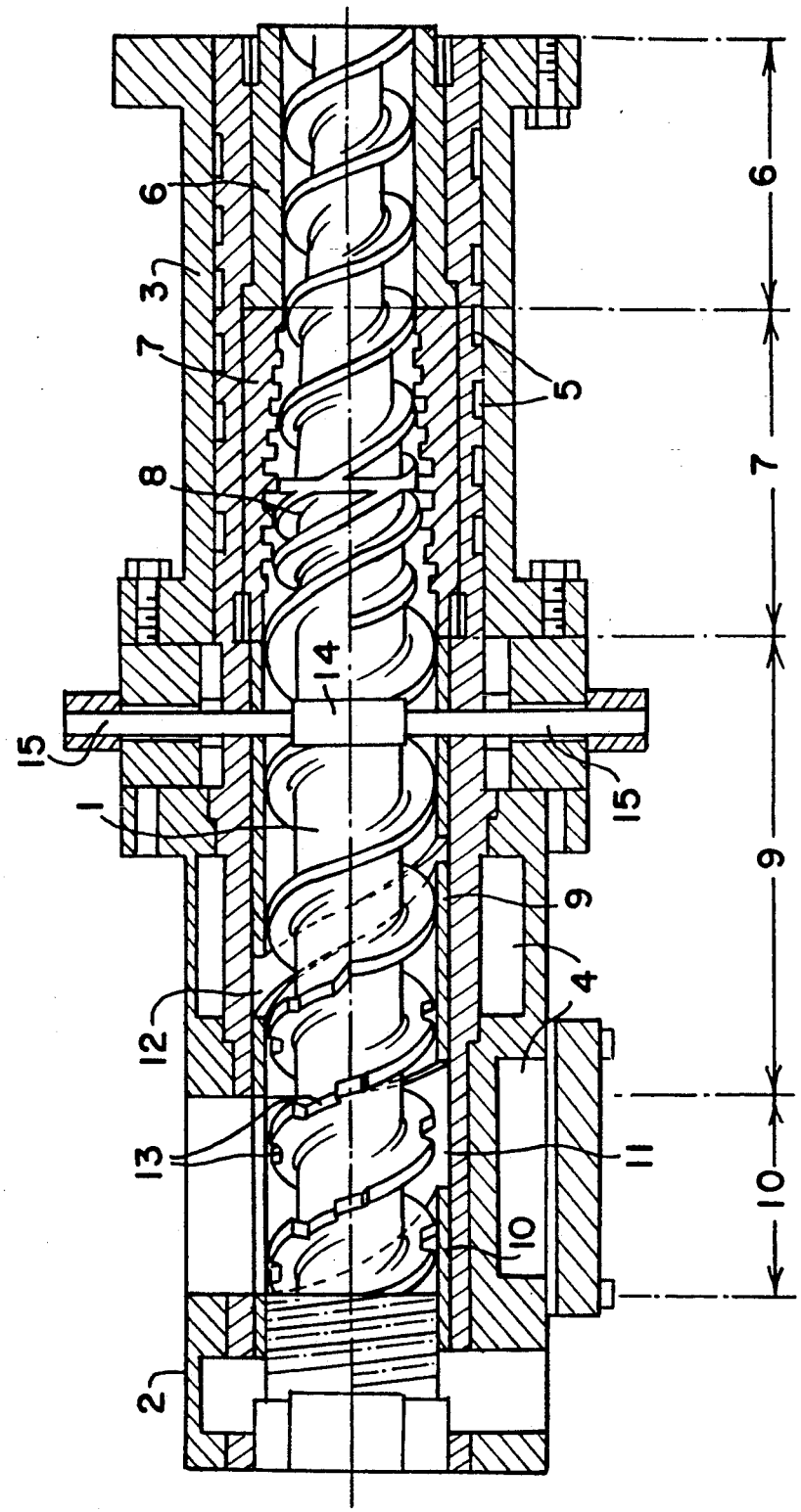
FIG. 1 is a sectional elevation embodying one pin-plane at the end of the compression-section just before the Transfermix plasticizing section.

In FIG. 1, the extruder-screw 1 is shown unsectioned in the sectioned housing 2 of the feed inlet 13, the sectioned compression-section and the sectioned extruder barrel 3. The housings are shown with passages 4 and 5 respectively for a heating/cooling fluid. The components adjacent to the screw are formed by sleeves:

At the outlet end there is a plain cylindrical sleeve 6. There is a Transfermix sleeve 7 in the plasticizing/mixing section of the extruder for cooperating with a corresponding Transfermix section 8 of the screw (U.S. Pat. Nos. 4,136,969 and/or 4,184,772 the specifications of which are incorporated herein by reference.) In the compression section there is sleeve 9 and under the inlet opening here is sleeve 10. The feed-pocket 11 in sleeve 10 extends under the inlet opening and runs into the spiral undercut 12 in sleeve 9 where the screw enters the barrel and carries on with its continuously reducing width for 360° round the screw, to end just before the end of the compression section,—as shown in U.S. Pat. No. 4,462,692.

At least over the length of the inlet-opening 10, but as shown, also extending over a part of the length of the compression section, the extruder screw flights are provided with notches 13 at an angle considerably greater than the lead-angle of the screw,—preferably at a lead-angle of 45°, as against a normal flight lead-angle in between 20° and 25°. These notches may start at depths of about half the depth of the flight, and then, especially in the compression-zone, reduce gradually in depth to finally run out, which makes a reduction in volume along the length of the screw parallel to that provided by the spiral undercut in the compression section. In practice for example a length of notch of 20-30 mm measuring along the length of the screw-flight and spaced at the same distance, has been found effective. The main function of the notches is to provide edges to grip the fresh feed so that this is pulled into the screw strictly in ratio to the speed of rotation.

However, the notches, in cooperation with the undercut, also provide a pre-plasticizing action for tough or hard compounds, thereby providing a contiguous mass to form the squash-back and to fill the spaces between pieces of unplasticized feed.

The circumferential cut 14 in the flights of screw 1 with its radially arranged row of flow interrupters which could be pins or deflectors 15 fixed in housing 2 is here shown at the end of the compression-section.

Figure 2:
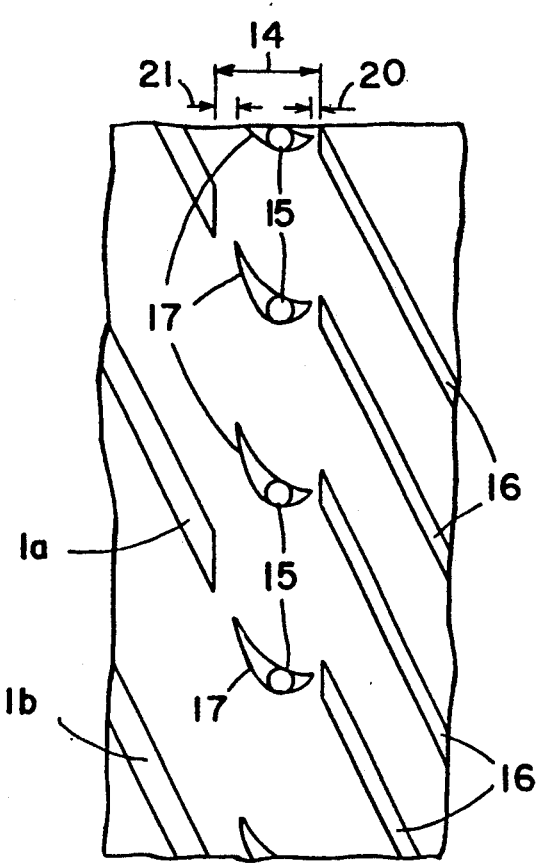
FIG. 2 is an enlarged section of a developed cross-sectional view of a preferred embodiment.

FIG. 2 shows in the enlarged section of a developed cross-sectional view, the annular space in which the compound flows. In this, 1a and 1b denote the two flights of the screw, interrupted by the cut 14, which ends at the 4 flights 16 of the transfer-zone 7. As distinct from FIG. 1, the two additional flights also start at full depth, as covered by our U.S. Pat. Nos. 4,136,969 and 4,136,969, though in these the step-wise and gradual build-up of additional screw flights is mentioned and shown as a preferred embodiment. However, such a beginning of a transfer-zone was published on Oct. 5-8, 1976 in the lecture "The Short Rubber Transfermix", Paul Meyer, Frenkel C-D Central Co., Ltd. to the International Rubber Conference, at the 110th Meeting of the Rubber Division, ACS, at San Francisco, see FIG. 3 part D for 4 flights and part E for 8 flights.

Figure 2A:
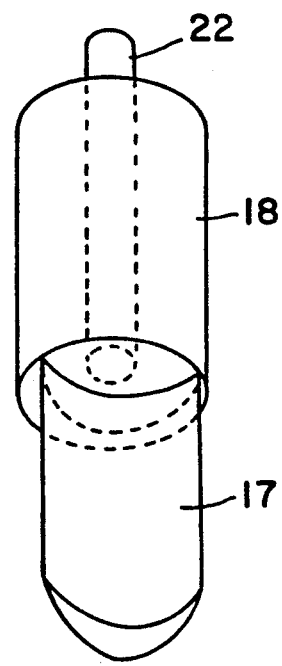
FIG. 2A is an enlarged view of a flow-interrupter/deflector of the embodiment of FIG. 2.

The flow-interrupters/deflectors 17 are shown equally distributed round the circumference. In the enlarged detail of FIG. 2A, they are shown as having a cross-sectional shape of a non-symmetrical crescent. Thereby streamlines around both sides of the crescent are displaced longitudinally relative to one another. This is, in any case, the essential action of a flow-interrupter even if it is a pin of circular cross-section.

The flow-interrupters/deflectors 17 are shaped not only to stop the rotation of the material with the screw, which would be achieved by circular pins already, but to substantially redirect the same against the rotation of the screw so as to enhance the action of pressure-buildup on the material meeting the increased number of flights of the transfermix plasticizing section.

The flow interrupter/deflector 17 could preferably be made by spark-erosion out of a solid pin 18, of a suitable quality of steel. This forms the shank of the interrupter 17 by means of which it is affixed to the barrel 2. This permits a different angular disposition than that shown.

Moreover, the shank 18 may be provided with an electrical heating element to permit additional heating of the flow interrupters/deflectors.

In operation, the deflectors, especially if separately heated to a temperature above that of the barrel, will cut into the flow of compound over the whole depth of the compression-section of the screw, and will, after deflection which amounts at least to a stopping of the rotation of the flow, be taken up by the 4 flights 16 of the transfer-zone, thereby causing a local pressure increase at 4 positions round the circumference 4 times per revolution.

In other embodiment, where for example there are 8 flights 16 at the beginning of the transfer-zone and 8 flow interrupters/deflectors are provided, this effect will be correspondingly enhanced over that caused by a set of pins co-acting with the two flights of a transport screw in the pin-barrel extruder.

Even for smaller, say 3¼" (95 mm) Transfermix cold feed extruders, 4 flights are standard at the beginning of the plasticizing zone,—as shown in FIG. 2.

A preferred arrangement is here shown wherein the axial distance 20 between the deflectors and the flights of the transfer-zone is smaller than the clearance 21 between the 2 flights of the transport-part of the screw and the leading edges of the deflectors.

Figure 3:
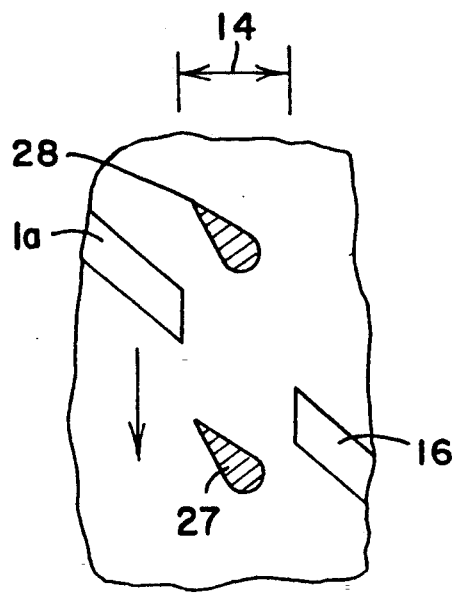
FIG. 3 is a section of a developed cross-sectional view showing by way of example an alternative section of a flow-interruptor.

FIG. 3 shows an alternative example, out of many possible ones, of a different cross-section of flow-interruptors for use in the example of FIGS. 1 and 2. The pins 27 are provided with a cutting edge 28, to provide a form of communication for hard or tough compounds fed as strip or sheet, with a minimum of mechanical work input, and extending over the whole depth of the screw-channel.

Figure 4:
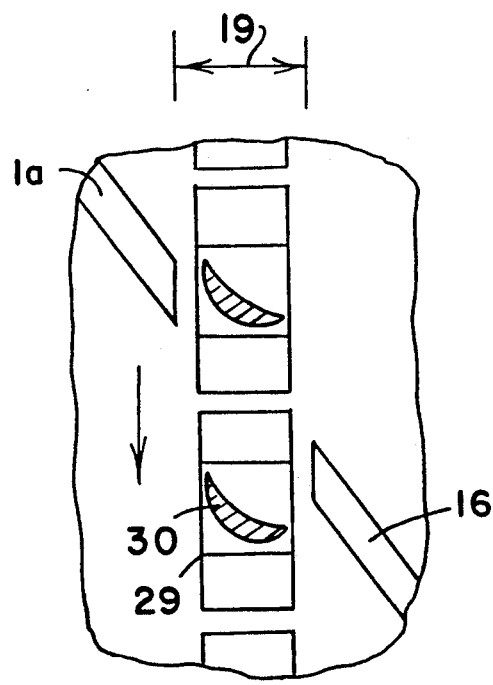
FIG. 4 is an enlarged sectional view of a development of a cross-section of a preferred embodiment of this invention.

FIG. 4 shows another embodiment of flow-interrupters/deflectors 30, in the cut 19 in a transport screw 1, held in bases 29 for support and for moving radially inwards and outwards again to clean these vanes at the end of a run as part of a cleaning cycle. This may be useful for very soft, smeary compounds, but is not needed for the majority of rubber compounds.

In a recent test on a 95 mm Transfermix Cold Feed extruder, an arrangement according to this invention has surprisingly provided an improvement of output amounting to over 10% on a nervy Natural Rubber Compound requiring about 85% throttling at the outlet-end of the transfermix section, at the highest screw-speed previously possible, with reduced extrusion temperature. Running at a higher screw-speed to come up to the permitted extrusion temperature provided another 12% of output, making a surprising improvement of output over 20% at an actually improved quality of extrudate.

Having now described this invention by way of example and in some detail, what I claim is:

1. An extruder with a screw rotatably mounted and driven to coact with a barrel, said extruder comprising an inlet, a compression section having at least one screw flight therein, a plasticizing section and an exit section, said plasticizing section embodying a Transfermix geometry, said plasticizing section following said compression section and including a plurality of helical grooves in the screw which vary in cross section from full area to zero area and substantially correspond to the length of the plasticizing section, a plurality of opposite-handed helical grooves in the barrel which correspondingly vary from zero area to full area, whereby in operation material is transferred from the screw to the barrel while being mixed and plasticized, the portion of said screw located immediately upstream of said plasticizing section comprising a circumferential cut extending substantially to the bottoms of said helical grooves of said screw, and said barrel, at a position therein corresponding to said cut, having a set of flow interrupters fixedly attached thereto, said flow interrupters being substantially equally spaced around the circumference of said screw, having sharp cutting edges directed into the flow of material coming from the flight of the screw in the compression section, and extending to a depth substantially equal to the bottoms of said helical grooves in said screw, said flow interrupters loosely fitting into said cut in said screw, said flow interrupters being provided with separate heating means to operate at a temperature in excess of that of the barrel.

2. An extruder with a screw rotatably mounted and driven to coact with a barrel, said extruder comprising an inlet, a compression section having at least one screw flight therein, a plasticizing section and an exit section, said plasticizing section embodying a Transfermix geometry, said plasticizing section following said compression section and including a plurality of helical grooves in the screw which vary in cross section from full area to zero area and substantially correspond to the length of the plasticizing section, a plurality of opposite-handed helical grooves in the barrel which correspondingly vary from zero area to full area, whereby in operation material is transferred from the screw to the barrel while being mixed and plasticized, the portion of said screw located immediately upstream of said plasticizing section comprising a circumferential cut extending substantially to the bottoms of said helical grooves of said screw, and said barrel, at a position therein corresponding to said cut, having a set of flow interrupters fixedly attached thereto, said flow interrupters being substantially equally spaced around the circumference of said screw, having sharp cutting edges and extending to a depth substantially equal to the bottoms of said helical grooves in said screw, said flow interrupters loosely fitting into said cut in said screw, said flow interrupters comprising deflectors of generally crescent-shaped cross section, each of said deflectors being arranged radially of said screw.

3. An extruder as claimed in claim 2, in which said deflectors are adapted to substantially redirect the flow of material to stop or reverse its rotation.

4. An extruder having a screw rotatably mounted and driven to coact with a barrel, said extruder comprising an inlet, a compression section, a plasticizing section and an exit section, said plasticizing section embodying a Transfermix geometry, said plasticizing section following said compression section and including a plurality of helical grooves in the screw which vary in cross section from full area to zero area and substantially correspond to the length of a plurality of opposite-handed helical grooves in the barrel which correspondingly vary from zero area to full area, whereby in operation material is transferred from the screw to the barrel while being mixed and plasticized, the portion of said screw located immediately upstream of said plasticizing section comprising a circumferential cut extending substantially to the bottoms of said helical grooves of said screw, and said barrel, at a position therein corresponding to said cut, having a set of flow interrupters fixedly attached thereto, said flow interrupters being substantially equally spaced around the circumference of said screw and extending to a depth substantially equal to the bottoms of said helical grooves in said screw, said flow interrupters loosely fitting into said cut in said screw and being providing with a separate heating means to operate at a temperature in excess of that of the barrel.

* * * * *